C. V. HAYNES.
VALVE.
APPLICATION FILED MAR. 11, 1916.
1,283,752.
Patented Nov. 5, 1918.
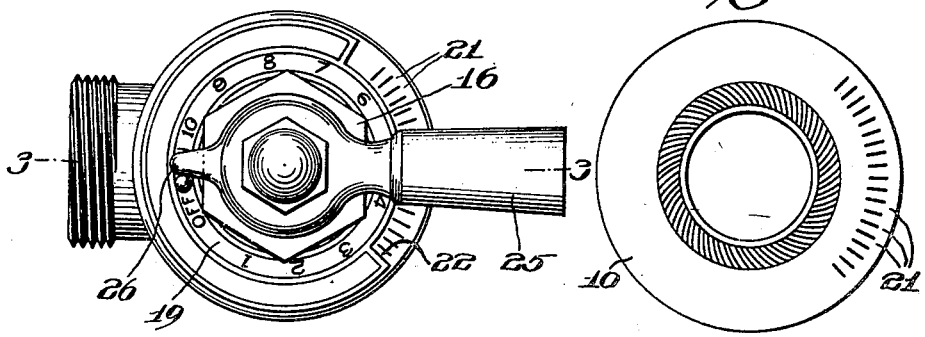
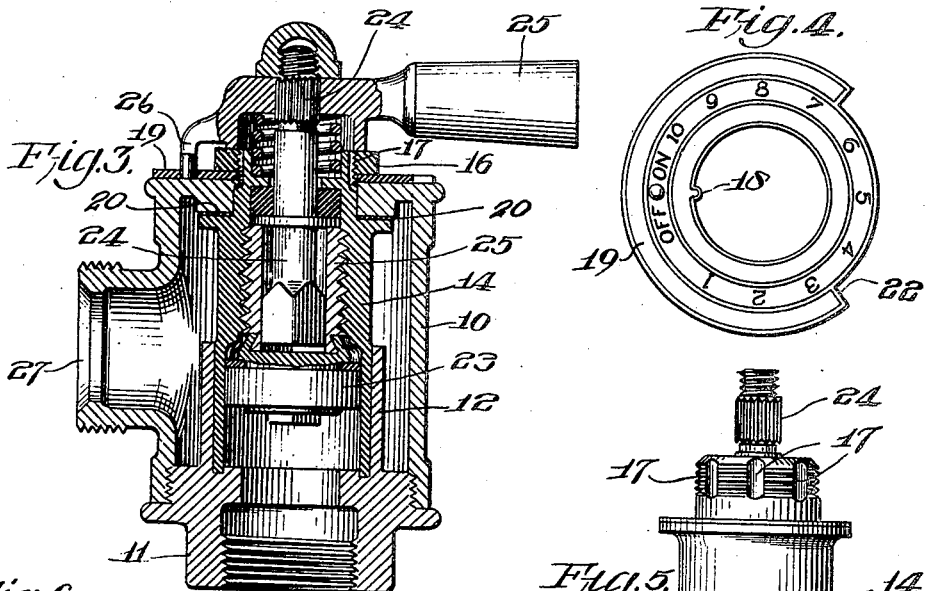
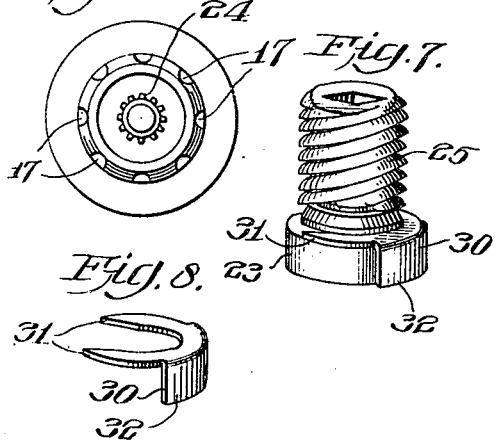
INVENTOR
Charles V. Haynes
BY
Chas. A. Cutter
ATTORNEY

UNITED STATES PATENT OFFICE.

CHARLES V. HAYNES, OF PHILADELPHIA, PENNSYLVANIA.

VALVE.

1,283,752.   Specification of Letters Patent.   Patented Nov. 5, 1918.

Application filed March 11, 1916. Serial No. 83,469.

*To all whom it may concern:*

Be it known that I, CHARLES V. HAYNES, a citizen of the United States, and a resident of the city and county of Philadelphia, State of Pennsylvania, have invented certain new and useful Improvements in Valves, of which the following is a specification.

My invention relates to improvements in valves for controlling the admission of steam, hot water, or vapor to radiators or other devices and more particularly to improvements in the form of valve illustrated, described and claimed in my application for United States Patent No. 31,108, filed in the Patent Office upon May 29, 1915, allowed August 6, 1915, and renewed April 30, 1917, with Serial No. 165,619.

My invention is illustrated in the accompanying drawings forming part of this specification and in which, Figure 1, is a plan of a valve embodying my improvements;

Fig. 2, a plan of the upper end of the valve casing;

Fig. 3, a section of the valve on line 3—3, Fig. 1;

Fig. 4, a plan of the adjustable dial plate;

Fig. 5, a side elevation of slotted sleeve, and the plug for closing the bottom of valve casing, the valve being shown partly lifted from its seat;

Fig. 6, a top view of the valve casing and the valve stem;

Fig. 7, a perspective view of the valve carrying the filler piece;

Fig. 8, a perspective view of the filler piece for preventing passage of steam, water, or vapor past the valve between the sides of the slot in the sleeve.

10 is the casing of the valve. 11 a hollow screw plug closing the lower end of casing 10 and carrying a stationary cylindrical sleeve 12 which is furnished with a slot 13 which when fully open passes the maximum quantity of steam, hot water, or vapor, say 200 feet. 14 is a rotatable sleeve the lower end of which is a close fit within the sleeve 12 and which is fitted with a slot 15 which is wide enough to, in one position, register with slot 13 in sleeve 12.

The upper end of rotatable sleeve 14 passes out through the upper end or top of casing 10 and is threaded to receive a nut 16, Figs. 1 and 3 and furnished with a number of vertical notches 17, Figs. 5 and 6, to receive a detent 18 on the graduated dial plate 19 which rests directly on top of the upper end of casing 10. 20 is a packing interposed between shoulders on the movable sleeve 14 and the casing 10. 21 graduations on the top of the casing 10 and 22 a notch in the periphery of the dial plate 19 through which the graduations 21 may be seen.

23 is a valve within movable sleeve 14 the stem 24 of which is angular and placed in an exteriorly threaded socket 25 which carries the valve, this threaded socket engaging threads upon the interior of the upper part of sleeve 14 is raised or lowered, raising or lowering the valve 23, by turning the handle 25 which is attached to the stem 24. 26 is a pointer on handle 25 which being brought to any one of the numerals 1, 2, 3, etc. on the dial plate 19 indicates the vertical height of the valve 23 from its seat. In Figs. 1 and 3 the valve is shown fully opened, in Fig. 5 but partly opened.

Owing to slight differences in construction the plug 11 is sometimes screwed farther into the casing 10 than at others hence the position of the slot 13 in the sleeve 12, in relation to the opening 27 in the valve casing, varies. This would interfere with accurate adjustment of slots 13—15 and in order that this may be corrected, before the valve passes from the hands of the maker, the sleeves are set as follows: valve being assembled the workman observes, say through opening 27, if the slots are in register, and if they are not he loosens nut 16 so that the dial plate 19 may be turned turning the rotatable sleeve 14 until its slot 15 is in exact register with the slot 13 in the stationary sleeve 12, it being understood that these slots are of substantially the same width. The dial plate is now lifted until its detent 18 is clear of the slots 17 in the upper end of sleeve 14 and is moved so that the notch 22 in the dial plate will expose all of the graduations 21 on top of the casing 10. In substantially this position the detent 18 will enter one of the notches 17 in sleeve 14 when the nut 16 is screwed down locking the plate 19 to the casing 10. The two openings 13—15 are now in register and the valve is open to its full capacity which will supply a full head of vapor, steam or water to a 200 foot radiator.

If the valve is to be applied to a radiator of less than 200 foot capacity the workman who is applying it to the radiator loosens the nut 16 and turns the dial plate 19 to the left. Each of the graduations 21 on the top of the casing 10 represents 10 feet and as the lower side of the notch 22 reaches successively these graduations the capacity of the full opening of the valve is reduced 10 feet, the valve as illustrated has, therefore, a capacity of from 10 to 200 feet depending upon the position of the dial plate. The dial plate having been moved so that the valve is adjusted for any sized radiator the nut 16 is screwed down and the dial plate locked to the casing. This adjustment is made at time of attaching the valve to the radiator and is never thereafter disturbed as varying amounts of steam, vapor or hot water are regulated, as may be desired, or weather conditions require, by simply raising or lowering valve 23 by turning handle 25 as previously described.

In my application No. 165,619, previously referred to, the filler piece or wing corresponding to member 30 in the present application and which prevents passage of steam at the slot past the valve formed part of or was soldered or brazed to the valve. I have found this construction to be expensive and I now propose to make this filler piece of pressed metal with bifurcated arms 31 which will grasp the stem carrying the valve 23 and with a turned down lip 32 which will engage part of the periphery of the valve 23 as shown. The lip 32 is the same thickness as the walls of the slot 15 and it is as wide as this slot.

It would be obvious that in the broader aspect of my invention either of the two cooperating and contacting cylindrical surfaces shown may be relatively fixed with respect to the other, the fixed one being shown as outside in my present application and as inside in my said application 165,619; also that the surface may be otherwise supported from or be part of the body of the valve as in the art without departing from the spirit and scope of my invention as claimed herein.

It will also be evident that making the filler member separable from or movable with respect to the disk 23, not only permits less expensive construction and machining of the disk and filler member, but secures more accurate machining of the parts than would otherwise be commercially practicable, as the disk can be turned in a lathe as distinguished from finishing in a shaper or by other axially moving tool. The separable or relatively movable filler shape adapts itself also to construction such as that here shown in which the valve disk is rotatable, though the filler member does not rotate.

It will be further evident that the use of two axially slotted sleeves separable from the valve as shown is desirable because of the more convenient finishing and repairs permitted.

Having thus described my invention I claim as new and desire to secure by Letters Patent:—

1. In a valve of the character set forth, in combination, a casing the top of which is graduated, a plug carrying a stationary slotted sleeve carried by the lower end of the casing, a rotatable sleeve the lower end of which is slotted and adapted to turn within said stationary sleeve and the upper end of which projects through the top of said casing and is threaded and furnished exteriorly with a number of vertical notches, a dial plate furnished with a detent adapted to enter one of the notches in said rotatable sleeve and with a slot on its periphery one end of said slot being adapted to register with the graduations on said casing top, a nut adapted to be screwed down on the threaded upper end of rotatable sleeve to fasten said sleeve and dial plate to said casing, a valve within the lower part of said rotatable sleeve, and means whereby said valve may be raised or lowered.

2. The combination in a valve, substantially as described, comprising a casing, a perforated plug carrying a stationary slotted sleeve closing the lower end of said casing, a rotatable slotted sleeve, turning within said stationary sleeve, the upper end of which projects through the top of said casing and which is exteriorly threaded and notched, of a dial plate furnished with a detent adapted to enter one of the notches in the upper end of said rotatable sleeve, a nut adapted to be screwed down upon said sleeve to lock said sleeve and dial plate to said casing after the slots in said stationary and rotatable sleeves have been set in a determined relation, a valve within the lower end of said rotatable sleeve, and means for vertically adjusting said valve so as to regulate the opening or slot in this end of the sleeve.

3. A valve casing provided with inlet and outlet openings, a valve seat about the inlet opening, coöperating longitudinally slotted cylindrical sleeves, one fixed, the other angularly adjustable, surrounding the seat and limiting the flow through the valve, an axially movable valve for the seat, operating mechanism for the valve and a filler for the slot of one of the sleeves separable from the valve and movable with it.

4. A valve casing provided with inlet and outlet openings, a valve seat about the inlet opening, coöperating longitudinally slotted cylindrical members one fixed, the other angularly adjustable, surrounding the seat and limiting the flow through the valve, a rotatable and axially movable valve for the seat, rotatable operating mechanism for the valve and a non-rotatable filler for the slot of the inner cylindrical member, movable axially with the valve.

5. In a valve having inlet and outlet openings, in combination, a casing, a cylindrical member about the inlet opening, open at the side and, rigid with respect to the lower part of the casing, the space between said member and casing being closed, a second cylindrical member open at the side and in contact along a cylindrical surface with the first and angularly adjustable to provide variant registering openings, a valve seat about the inlet opening, a disk valve movable axially with respect to the two members and seat, a filler piece carried by the valve, longitudinally movable with it and entering and closing the slot in the adjoining member, means for retaining the second member in adjusted positions, and means for moving the valve disk and filler piece axially of the two members.

6. In a valve having inlet and outlet openings, in combination, a casing having a graduated top surface, a longitudinally slotted sleeve fixed with respect to the casing, a valve seat within the sleeve and surrounding the inlet opening, an angularly adjustable slotted sleeve coaxial with and inside the fixed sleeve, having surface contact therewith, means for retaining the second sleeve in adjusted position, an axially movable disk valve for the seat, coöperating threads connected with the disk valve and inner sleeve, a handle and connections for rotating the disk to axially move the same, a pointer movable with the handle over the graduations and a filler piece for the slot in the inner sleeve carried by the disk and rotatable with respect to it.

7. In a valve, in combination, a casing having inlet and outlet openings and a closure for an end thereof rigid with the casing, a valve seat about the inlet opening, a cylindrical side wall rigid with the casing, coaxial with the valve seat and longitudinally open at one side, an angularly adjustable sleeve coaxial with the side wall and open longitudinally at one side, engaging the cylindrical wall, means for holding the sleeve in its adjustments, a disk valve for the seat, operating mechanism moving the valve axially, and a filler for one of the longitudinal openings movable with the valve and separable therefrom.

8. In a valve having inlet and outlet openings, in combination, a casing, a closure for an end thereof rigid with the casing, a valve seat therein about the inlet opening, a cylindrical side wall rigid with the casing, coaxial with the valve seat and open at the side, a sleeve coaxial with the side wall, open longitudinally along one side, angularly adjustable and fitting the side wall, means for fixing the sleeve in adjusted positions, a disk valve for the valve seat, operating mechanism for moving the valve axially of the seat, and a filler for one of the openings movable with the disk, rotatable with respect to it and removable from it transversely of its axis.

9. In a valve having end inlet and side outlet, in combination, a casing, a closure for the end thereof having an inlet opening, an inlet valve seat in the closure about the inlet opening, cylindrical side walls longitudinally open at one side and rigid with the casing, an angularly adjustable sleeve in contact with the walls and slotted at a side longitudinally, means for fixing the sleeve in positions of adjustment, a disk valve for the seat, operating mechanism for moving the valve axially of the seat, and a filler member having an arcuate axially extending filler for one of the openings at a point opposite the disk and a laterally extending bifurcated top for longitudinal actuation with the disk.

10. In a valve having end inlet and side outlet openings, in combination, an outer casing, two relatively adjustable cylindrical surfaces longitudinally open at one side, the casing being closed at its inlet end in contact with the surfaces, a valve seat within the surfaces and about the inlet opening, means for fixing the extent of register of the openings in the surfaces, a valve for the valve seat, means for longitudinally moving the valve, and a filler for the opening through one of the surfaces separable from the valve and longitudinally movable therewith.

11. In a valve having end inlet and side outlet openings, in combination, a casing having an open end, a plug closing the open end and provided with an inlet opening, a longitudinally slotted sleeve carried by the plug, a valve seat within the sleeve about the opening, a second longitudinally slotted sleeve between the first sleeve and the inlet opening, said second sleeve being angularly adjustable, a thread interior to the second sleeve, a disk valve for the inlet opening, a thread connected with the disk valve, coöperating with the interior thread, an operating handle, a stem extending axially of the sleeves and having a non-circular end fitting in a corresponding recess movable with the valve, and a filler for the slot of the inner sleeve carried longitudinally with the valve and free to rotate with respect thereto.

12. In a valve having cylindrical surfaces, one inside the other, both open lengthwise at one side and one angularly adjustable with respect to the other to determine the width of the outlet opening, and an inlet opening within the cylinders, the new combination which consists in using with these elements a valve for the inlet opening and a filler supported to move with the valve, but separable from it and adapted to close the opening in the inner cylindrical surface.

13. In a valve as claimed in claim 12, the new combination which consists in adapting the valve to turn circumferentially and in locating the filler in engagement with the edge walls of the outlet opening to prevent it from turning.

14. In a valve as claimed in claim 12, the new combination which consists in adapting both cylindrical surfaces to be removed from the valve body, providing a helical guide for the movement of the valve and providing a guide parallel to the axis for movement of the filler.

CHARLES V. HAYNES.

Witnesses:
CHARLES A. RUTTER,
CHARLES HERMAN.